United States Patent [19]

Maehara

[11] Patent Number: 5,247,640
[45] Date of Patent: Sep. 21, 1993

[54] DUAL ACCESS CONTROL SYSTEM INCLUDING PLURAL MAGNETIC DISK CONTROL UNITS AND CONTENTION CONTROL CIRCUITRY

[75] Inventor: Yoshimi Maehara, Tokyo, Japan

[73] Assignee: Oki Electric Industry Co., Ltd., Tokyo, Japan

[21] Appl. No.: 558,902

[22] Filed: Jul. 27, 1990

[30] Foreign Application Priority Data

Aug. 14, 1989 [JP] Japan ................... 1-207922

[51] Int. Cl.⁵ ............................ G06F 13/00
[52] U.S. Cl. ................... 395/425; 395/275; 360/69
[58] Field of Search ............ 395/425, 275; 364/200 MS File, 900 MS File; 360/69

[56] References Cited

U.S. PATENT DOCUMENTS 4,807,180 2/1989 Takeuchi et al. ............. 395/425

Primary Examiner—Glenn Gossage
Attorney, Agent, or Firm—Panitch, Schwarze, Jacobs & Nadel

[57] ABSTRACT

A dual access control system is disclosed including a write-only memory portion for storing dual access commands issued from a host unit and unit addresses of a magnetic-disk unit, and a contention control portion for receiving coded signals representing the dual access commands and a control signal generated by magnetic-disk control portions. The contention control portion first generates a unit select tag signal for allowing the unit addresses of the magnetic-disk unit to be processed upon receipt of the coded signals and the control signal. The contention control portion then generates a tag signal and a bus bit signal which are supplied to the magnetic-disk unit upon reception of a response signal from the magnetic disk unit, a reset signal which is supplied to the write-only memory portion, a write timing signal which is supplied to a read-only memory portion and an output signal which is used to generate an interruption signal. The interruption signal is sent from magnetic-disk control portions to the host unit. The host unit recognizes the execution of the commands upon receipt of the interruption signal from the magnetic-disk control portions.

6 Claims, 19 Drawing Sheets

Fig. 3(A)

| b7 b6 b5 | FUNCTION SELECTION |
|---|---|
| 0 0 0 | ABORT |
| 0 0 1 | DISABLE |
| 0 1 0 | DISABLE |
| 0 1 1 | DISABLE |
| 1 0 0 | RESERVE |
| 1 0 1 | PRIORITY SELECT |
| 1 1 0 | RELEASE |
| 1 1 1 | DISABLE |

Fig. 3(B)

| b2 b1 b0 | UNIT ADDRESS |
|---|---|
| 0 0 0 | ADDRESS UNIT = 0 |
| 0 0 1 | ADDRESS UNIT = 1 |
| 0 1 0 | ADDRESS UNIT = 2 |
| 0 1 1 | ADDRESS UNIT = 3 |
| 1 0 0 | ADDRESS UNIT = 4 |
| 1 0 1 | ADDRESS UNIT = 5 |
| 1 1 0 | ADDRESS UNIT = 6 |
| 1 1 1 | ADDRESS UNIT = 7 |

Fig. 4

| BIT NUMBER | FUNCTION |
|---|---|
| b'7 | INDICATES STATE OF b7 IN CONTROL REGISTER 15. See Fig. 3(A) |
| b'6 | INDICATES STATE OF b6 IN CONTROL REGISTER 15. See Fig. 3(A) |
| b'5 | INDICATES STATE OF b5 IN CONTROL REGISTER 15. See Fig. 3(A) |
| b'4 | INDICATES THAT MAGNETIC DISK UNIT IS RESERVED WHEN "1" |
| b'3 | INDICATES THAT MAGNETIC DISK UNIT IS RESERVED BY OTHER CONTROL UNIT WHEN "1" |
| b'2 | |
| b'1 | INDICATES STATE OF b2 TO b0 IN CONTROL REGISTER 15. See Fig. 3(B) |
| b'0 | |

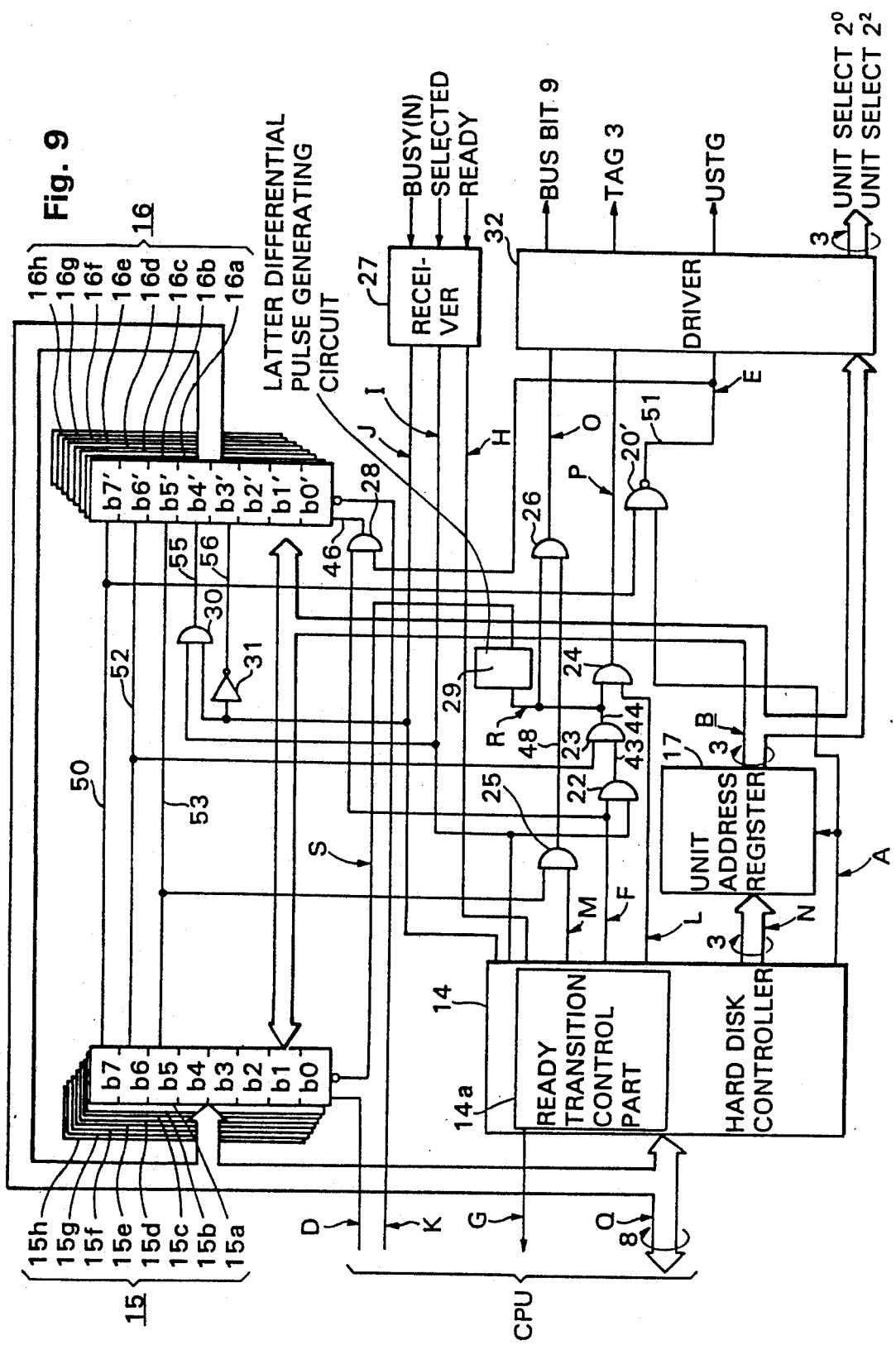

Fig. 10

| UNIT ADDRESS OF MAGNETIC-DISK UNIT | CONTROL REGISTER 15 | CONTROL REGISTER 16 |
|---|---|---|
| UNIT ADDRESS #0 | CONTROL REGISTER 15a | CONTROL REGISTER 16a |
| UNIT ADDRESS #1 | CONTROL REGISTER 15b | CONTROL REGISTER 16b |
| UNIT ADDRESS #2 | CONTROL REGISTER 15c | CONTROL REGISTER 16c |
| UNIT ADDRESS #3 | CONTROL REGISTER 15d | CONTROL REGISTER 16d |
| UNIT ADDRESS #4 | CONTROL REGISTER 15e | CONTROL REGISTER 16e |
| UNIT ADDRESS #5 | CONTROL REGISTER 15f | CONTROL REGISTER 16f |
| UNIT ADDRESS #6 | CONTROL REGISTER 15g | CONTROL REGISTER 16g |
| UNIT ADDRESS #7 | CONTROL REGISTER 15h | CONTROL REGISTER 16h |

DUAL ACCESS CONTROL SYSTEM INCLUDING PLURAL MAGNETIC DISK CONTROL UNITS AND CONTENTION CONTROL CIRCUITRY

BACKGROUND OF THE INVENTION

1. Field of the Invention

The present invention relates to a dual access control system for a magnetic-disk unit, particularly to a dual channel magnetic-disk unit (hereinafter referred to as a magnetic-disk unit) accessible by two magnetic-disk control units (hereinafter referred to as control units).

2. Description of the Related Art

A dual access control system of this type has been described in a document entitled "CDC STORAGE MODULE DRIVE Pub. No. 83322320" published in 1983 by Control Data Corporation.

The dual access control system will be described with reference to this document in the case where two control units compete with each other.

A process for controlling one magnetic-disk unit by two magnetic-disk control units comprises a reserve function for reserving the magnetic disk (hereinafter referred to as reserve), a release function for releasing the magnetic-disk unit from a reserved condition (hereinafter referred to as release), and a force function for causing the magnetic-disk unit to be reserved (hereinafter referred to as priority select). Execution of the reserve, the release and the priority select functions is controlled by a combination of signals, i.e., a unit select signal, a bus bit signal, and a tag signal, sent between the magnetic-disk unit and the control units.

FIG. 14 is a system arrangement employing a dual access control system for a prior art magnetic-disk unit.

A central processing unit (hereinafter referred to as CPU) 64, a main memory (hereinafter referred to as MEM) 65, and one control unit 68 are connected with each other on a line 74 via lines 71 to 73 while a CPU 66, an MEM 67, and another control unit 69 are connected with each other on a line 80 via lines 77 to 79. The control units 68, 69 are connected with a magnetic-disk unit 70 by lines 75, 76.

FIG. 15 is a prior art block diagram illustrating the flow of interface signals in the dual access control system of FIG. 14.

A host unit 62 comprising the CPU 64 and the MEM 65 is connected via line 73 to the control unit 68 comprising a processing unit 81 for controlling the magnetic-disk unit 70, a control memory 82 for storing microprogram comprising a magnetic disk control procedure, and a magnetic-disk control part 83. Interface signal lines 75 are positioned between the control unit 68 and the magnetic-disk unit 70 and include interface control signals such as a unit select tag signal (hereinafter referred to as the USTG signal) for connecting the magnetic disk control part 83 with the magnetic-disk unit 70.

The operation of the dual access control system having such structure will now be described.

If a reserve, release or priority select command is sent from the CPU 64 to the control unit 68, the control unit 68 supplies control signals to the magnetic-disk unit 70 by way of the interface lines 75. The control signals include the USTG signal, which is a magnetic disk select signal and constitutes a tag signal of a unit select $2^0$ to $2^2$ signal (hereinafter referred to as UNIT SELECT $2^0$ to $2^2$ signal) The UNIT SELECT $2^0$ to $2^2$ signal designates a magnetic disk number and is significant (i.e., contains valid data) only when the USTG signal is enabled. A tag 3 signal (hereinafter referred to as the TAG 3 signal) is a tag signal of a bus bit 9 signal (hereinafter referred to as BUS BIT 9 signal) for causing release of the magnetic-disk unit when the TAG 3 signal is effective (i.e., enabled). Both a unit selected signal (hereinafter referred to as the SELECTED signal) and a busy signal (hereinafter referred to as the BUSY signal) are response signals of the magnetic-disk unit 70 for responding to the USTG signal.

FIG. 16 is a prior art timing diagram illustrating a reserve sequence and priority select sequence of the dual access control system of FIG. 14.

When the UNIT SELECTED signal goes "1", the magnetic-disk unit is reserved. When the BUSY signal goes "1", the magnetic-disk unit is not reserved since the same disk is reserved by the other control unit. As far as the priority select command is concerned, the magnetic-disk unit is reserved even if the same magnetic-disk unit is reserved by another control unit.

FIG. 17 is a timing diagram illustrating a release sequence of the dual access control system of FIG. 14.

Referring to the timing diagram, if the TAG 3 signal and the BUS BIT 9 signal are issued relative to the release command, the reserved magnetic-disk unit is released.

Inasmuch as hard disk controllers available in the present market are not provided with the functions of reserve, release, and priority select, the control units receive the commands involved in selecting the reserve, release, priority select functions and execute the functions on the basis of a microprogram control system provided with a control memory and a control processor respectively incorporated in the control units.

Prior art dual access control systems for magnetic-disk units typically require firmware control circuits. In contrast, microcomputer systems are characterized in that control functions are performed in software (as much as possible) in order to minimize the amount and cost of hardware. Providing the above-mentioned firmware control circuits in microcomputer systems would so increase the size and cost of hardware (i.e., the scale of hardware) that the advantageous features of the microcomputer systems would be lost. Thus, a problem exists because conventional dual access control systems (typically implemented using firmware control circuits) cannot be easily or advantageously used in microcomputer systems.

SUMMARY OF THE INVENTION

It is a first object of the present invention to provide a dual access control system capable of accessing, in a small-scale computer system such as a microcomputer, a plurality of magnetic disk control units without the use of magnetic disk firmware.

It is a second object of the present invention to provide a dual access control system for a magnetic-disk unit capable of executing reserve, release, and priority select and abort commands independently of other magnetic-disk units to thereby enhance the operation of the overall system.

Briefly, the present invention is directed to a dual access control system which includes a magnetic disk unit and a magnetic disk control unit. The magnetic disk control unit includes means for receiving from a host unit a unit address of the magnetic disk unit and a reserve command to reserve the magnetic disk unit. The dual access control system also includes a magnetic disk control means for generating signals in accordance with the reserve command, wherein the signals comprise the unit address. The magnetic disk control means also include means for sending the signals to the magnetic disk unit to reserve the magnetic disk unit, for receiving an output signal indicative of the execution of the reserve command from a contention controller, and for supplying an interrupt signal to the host unit to report the execution of the reserve command.

A first memory stores the reserve command and the unit addresses in synchronization with a timing signal issued by the host unit. A unit address memory stores the unit address contained in the signals generated by the magnetic disk control means. A second memory stores a stored content of the first memory and a selection signal indicative of selection or non-selection of the magnetic disk unit and supplies the stored content of the first memory and the selection signal to the host unit in synchronization with the timing signal issued by the host unit.

The contention controller comprises means for receiving output signals from the unit address memory and the first memory and for generating a unit select tag signal to indicate that the unit address is valid. The contention controller further includes means for receiving a response signal from the magnetic disk unit and signals from the magnetic disk control means, for generating and supplying a tag signal and a bus bit signal to the magnetic disk unit, for generating and supplying a reset signal to the first memory, for generating and supplying a selection signal and a write timing signal to the second memory, and for generating and supplying an output signal to the magnetic disk control units.

The above and other objects, features and advantages of the present invention will become more apparent from the following description taken in conjunction with the accompanying drawings.

BRIEF DESCRIPTION OF THE DRAWINGS

FIGS. 3(a) and 3(b) are tables depicting function selection and unit addressing codes, respectively, of a write-only control register according to the first embodiment of the present invention;

FIG. 4 is a table depicting the function of each bit of a read-only control register according to the first embodiment of the present invention;

FIG. 9 is a circuit diagram of the dual access control system according to the second embodiment of the present invention;

FIG. 10 is a table illustrating the relationship among unit addresses, write-only control registers and read-only control registers according to the second embodiment;

DESCRIPTION OF THE PREFERRED EMBODIMENTS

First Embodiment (FIGS. 1-7)

Figure 1A:
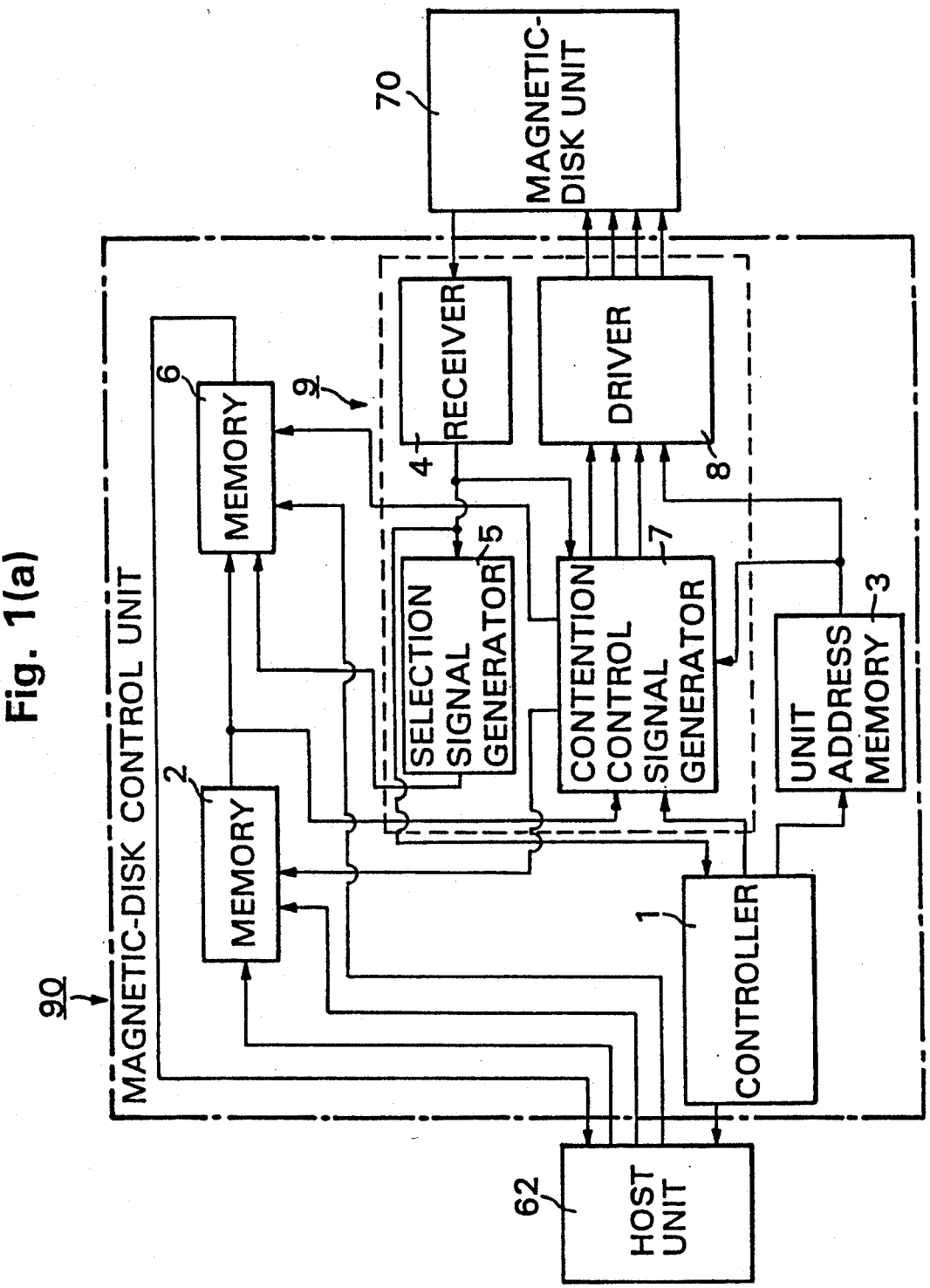
FIGS. 1(a) and 1(b) are block diagrams of a dual access control system according to a first embodiment of the invention.

A dual channel magnetic-disk unit accessible by two control units will be described first with reference to FIGS. 1-7.

FIGS. 1 (a) and (b) are block diagrams of a dual access control system according to a first embodiment of the present invention.

A magnetic-disk control means 1 (hereinafter referred to as controller 1) generates a polling signal which is supplied to a magnetic-disk unit 70 and a control signal for causing a dual access command to be executed. The controller 1 also receives an output signal issued by a contention controller 9, processes the same output signal, and provides to a host unit 62 an interruption signal indicative of the completion of the execution of the dual access command. A write-only memory 2 stores commands provided by the host unit 62 and each code of unit addresses in synchronization with a timing signal issued by the host unit 62. A unit address memory 3 stores therein the unit address which is generated upon polling by the controller 1. A read-only memory 6 stores therein a selection signal indicative of selection or non-selection of the magnetic-disk unit 70 and an output signal issued by the write-only memory 2 and provides them to the host unit 62 in synchronization with the timing signal issued by the host unit 62.

The contention controller 9 comprises a receiver 4, a selection signal generator 5, a contention control signal generator 7, and a driver 8. The receiver 4 receives a response signal issued by the magnetic-disk unit 70 and supplies it to the controller 1, the selection signal generator 5, and the contention control signal generator 7. The selection signal generator 5 generates a selection signal on the basis of an output from the receiver 4 and supplies it to the read-only memory 6. The contention control signal generator 7 receives an output signal from the write-only memory 2 and an output signal from the unit address memory 3 and generates a unit select tag signal for causing the magnetic-disk unit 70 to process the unit address supplied to the magnetic-disk unit 70. The contention control signal generator 7 also receives the control signal from the controller 1 and the output signal from the receiver 4 and generates a TAG 3 signal (also called "tag signal") and a bus bit signal which are supplied to the magnetic-disk unit 70. The TAG 3 signal (i.e., the tag signal) indicates that the bus bit signal is valid (i.e., "effective"). The contention control signal generator 7 also generates a reset signal which is supplied to the write-only memory 2 and a write timing signal which is supplied to the read-only memory 6. The driver 8 receives the unit address signal from the unit address memory 3, the unit select tag signal, the tag signal, the bus bit signal from the contention control signal generator 7 and provides drive signals to the magnetic-disk unit 70.

Figure 1B:
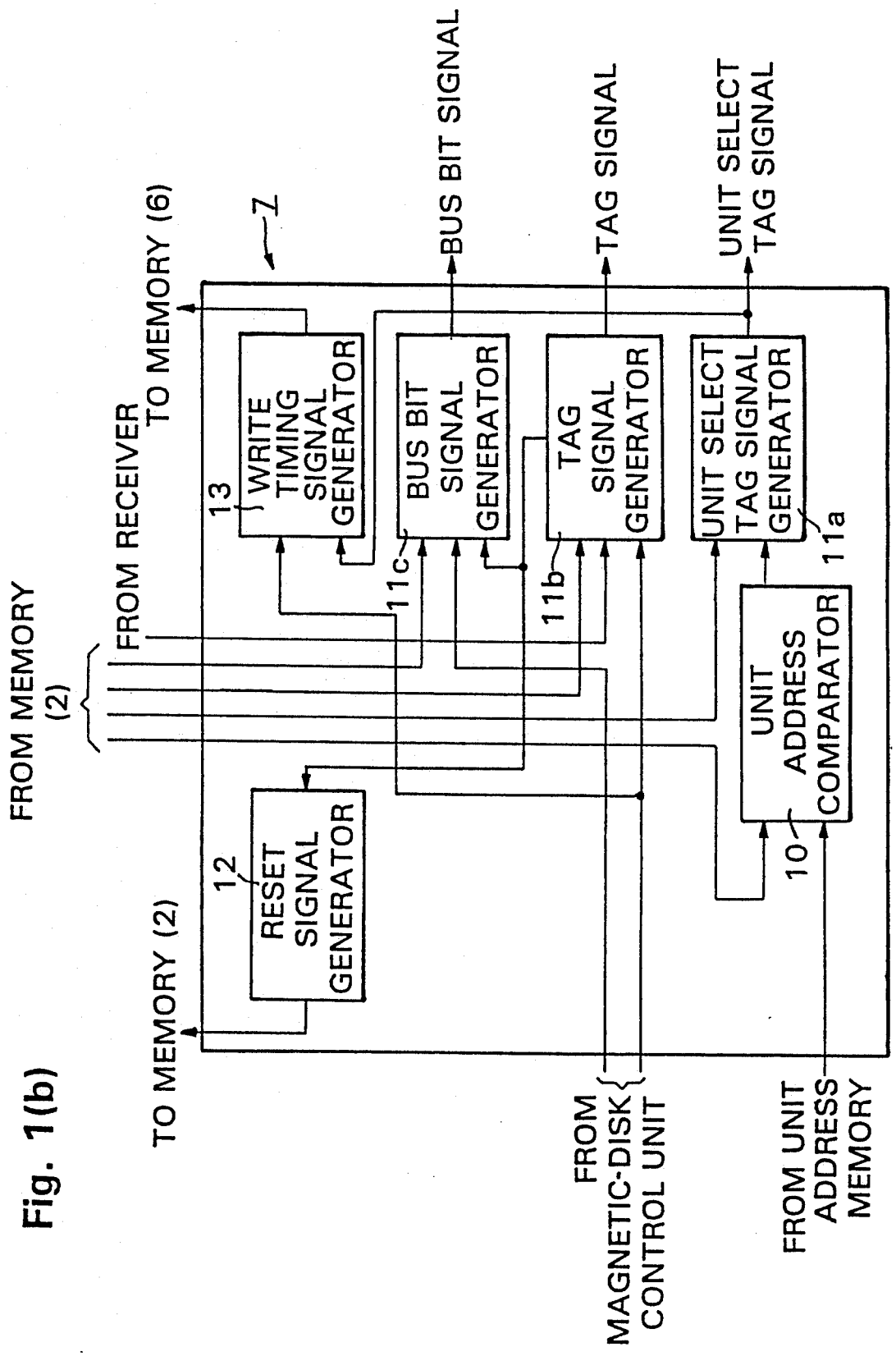

FIG. 1(b) is a block diagram of the contention control signal generator 7 of FIG. 1(a).

The contention control signal generator 7 comprises a unit address comparator 10, a unit select tag signal generator 11a, a tag signal generator 11b, a bus bit signal generator 11c, a reset signal generator 12 and a write timing signal generator 13. The unit address comparator 10 compares a unit address contained in the output signal from the write-only memory 2 with the output signal from the unit address memory 3. The unit select tag signal generator 11a generates the unit select tag signal which causes the magnetic-disk unit 70 to process the unit address which is supplied to the magnetic-disk unit 70, based on the output signal from the unit address comparator 10 and the output signal from the write-only memory 2. The tag signal generator 11b receives the output signals from the controller 1, the write-only memory 2, and the receiver 4 as illustrated in FIG. 1(a) and generates the tag signal. The bus bit signal generator 11c receives the output signals from the controller 1, the write-only memory 2, and the tag signal generator 11b and generates a bus bit signal. The reset signal generator 12 receives the output signal from the tag signal generator 11b and generates a reset signal for resetting the write-only memory 2. The write timing signal generator 13 receives the output signals from the unit select tag signal generator 11a and the controller 1 and generates a write timing signal which is supplied to the read-only memory 6.

Figure 2:
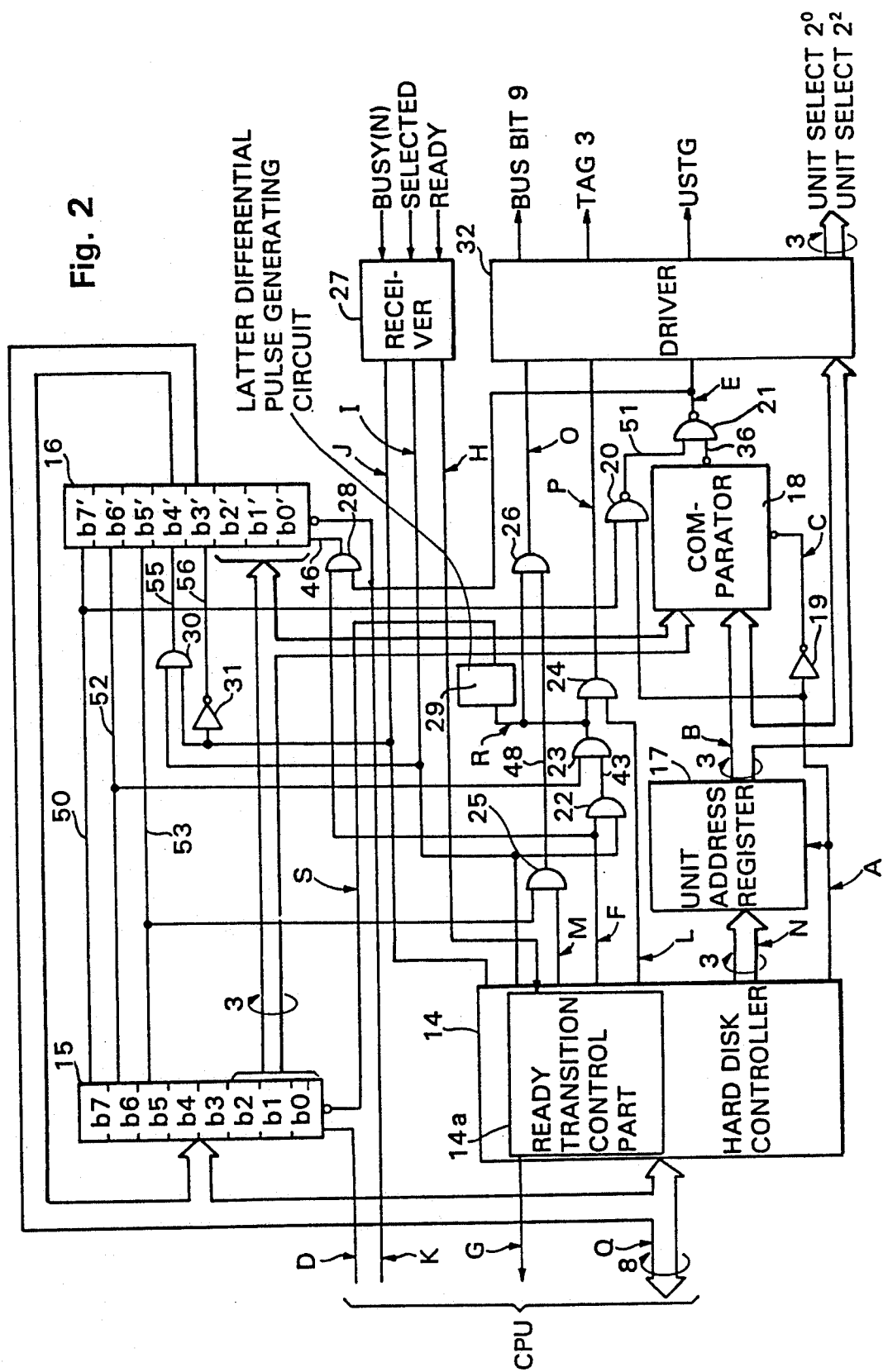
FIG. 2 is a circuit diagram of the dual access control system according to the first embodiment of the present invention.

FIG. 2 is a circuit diagram of the dual access control system according to the first embodiment of the present invention.

The dual access control system comprises a hard disk controller LSI 14, preferably implemented using large scale integration (LSI) techniques, a write-only control register 15, read-only control register 16, a unit address register 17, a receiver 27, an AND gate 30, an inverter 31 and a driver 32 corresponding to the controller 1, the write-only memory 2, the read-only memory 6, the unit address memory 3, the receiver 4, the selection signal generator 5, and the driver 8, respectively. The dual access control system also comprises a comparator 18, an inverter 19, a NAND gate 20, a NOR gate 21, AND gates 22, 23, 28, OR gates 24, 25, 26, and a latter differential pulse generating circuit 29 (the term "latter" means "trailing edge", indicating that the pulse generated by the pulse generating circuit 29 trails in synchronization with the falling of the input to the pulse generating circuit 29) which collectively represent the contention control signal generator 7.

A signal line Q, or host data bus, includes eight bits and is connected to the hard disk controller LSI 14, the write-only control register 15 (hereinafter referred to as control register 15) and the read-only control register 16 (hereinafter referred to as control register 16). An output signal line A of the hard disk controller LSI 14 is connected to the unit address register 17, the NAND gate 20, and the inverter 19, and is used to send the unit address to the magnetic-disk unit 70 (as illustrated in FIG. 1) via the NAND gate 20 and via the inverter 19. An output signal line C of the inverter 19 is connected to the comparator 18. An output signal line 36 of the comparator 18 is connected to the NOR gate 21. An output signal line E of the NOR gate 21 is connected to an input of the AND gate 28. The output signal line E is also connected to the driver 32 and is connected therethrough to the USTG signal line. The USTG signal line is connected to the magnetic-disk unit 70. An output signal line N (having a three bit width) of the hard disk controller LSI 14 is connected to the unit address register 17. An output signal line B of the address register 17 is connected to the comparator 18 to form the UNIT SELECT $2^0$ to $2^2$ signal lines which are connected to the magnetic-disk unit 70.

An output signal line L of the hard disk controller LSI 14 is connected to the OR gate 24. An output signal line P of the OR gate 24 is connected to a TAG 3 signal line via the driver 32 and is connected to the magnetic-disk unit 70. An output signal F of the hard disk controller LSI 14 is connected to the AND gates 22 and 28. An output signal line 43 of the AND gate 22 is applied to the AND gate 23. An output signal line R of the AND gate 23 is connected to the OR gates 24, 26 and to the latter differential pulse generating circuit 29. An output signal line S of the latter differential pulse generating circuit 29 is connected to a reset terminal of the control register 15. An output signal line 46 of the AND gate 28 is connected to the control register 16 and is used to transfer data sample clock pulses. An output signal line I of the hard disk controller LSI 14 is connected to the OR gate 25. An output signal line 48 of the OR gate 25 is applied to the OR gate 26. An output signal line O of the OR gate 26 is connected via the driver 32 to the magnetic-disk unit 70 as a BUS BIT 9 signal line. The bits 2 to 0 (that is, bits $b_2$, $b_1$, and $b_0$) of the control register 15 are connected to the comparator 18 and the control register 16. An output signal line 50 of a bit $b_7$ is connected to a bit $b'_7$ of the control register 16 and to the NAND gate 20. An output signal line 51 of the NAND gate 20 is connected to the NOR gate 21. In the same way, an output signal line 52 of a bit $b_6$ is connected to a bit $b'_6$ of the control register 16 and to the AND gate 23. An output signal line 53 of a bit $b_5$ is connected to a bit $b'_5$ of the control register 16 and to the OR gate 25.

The receiver 27 receives a BUSY(N) signal (N is a negative polarity) when the magnetic-disk unit 70 is reserved by another control unit. An output signal line J is connected to the hard disk controller LSI 14, the AND gate 30 and the inverter 31. Output signal lines 55, 56 of the AND gate 30 and the inverter 31 are respectively connected to a bit $b'_4$ and a bit $b'_3$ of the control register 16. The receiver 27 receives a SELECTED signal when the magnetic-disk unit 70 is selected. An output signal line I of the receiver 27 is connected to the hard disk controller LSI 14 and the AND gates 22, 30. The receiver 27 receives a READY signal when the magnetic-disk unit 70 is ready to be reserved. An output signal line H from the receiver 27 is applied to an input side of a READY transition control part 14a in the hard disk controller LSI 14. An output signal line G is connected from the READY transition control port 14a to the CPU 64, the output signal line G representing an interruption signal line.

A signal line D, connected to a set terminal of the control register 15, and a signal line K connected to an enable terminal of the control register 16, are both connected to the CPU 64.

The control register 15 specifies commands for accessing the magnetic-disk unit 70. The host program can arbitrarily issue commands during idle states when the hard disk controller LSI 14 does not execute data write commands or data read commands at the magnetic-disk unit 70.

FIGS. 3(a) and (b) are tables illustrating control bits of the write-only control register.

FIG. 3(a) is directed to bits $b_5$, $b_6$, $b_7$ which pertain to selecting command functions. Reserve is a command for reserving the magnetic-disk unit, release is a command for releasing the reserved magnetic-disk unit, and priority select is a command for forcibly reserving the magnetic-disk even when the magnetic-disk is reserved by another control unit. Abort is a command to abandon execution of the aforementioned three commands.

FIG. 3(b) is directed to bits $b_0$, $b_1$, and $b_2$, which pertain to selecting magnetic-disk unit addresses corresponding to the UNIT SELECT $2^0$ to $2^2$ signals. The unit addresses shown in FIG. 3(b) are addresses of magnetic-disk units #0, #1, ... #7 (these magnetic-disk units are collectively represented by magnetic-disk unit 70 in FIG. 1). According to the present embodiment, $b_4$ and $b_3$ are not used. The control register 16 stores a result code which indicates the result of executing the dual access control command at the magnetic-disk unit. The host program reads control register 16 as required.

FIG. 4 is a table depicting the function of each bit of the read-only control register. The bits $b'_7$ to $b'_5$ indicate the content of executed commands in that the contents of the bits $b_7$ to $b_5$ of the control register 15 are held in bits $b'_7$ to $b'_5$ just after the execution of the reserve command. Bit $b'_4$ equals "1" upon execution of the reserve command, thereby indicating that the magnetic-disk unit is reserved. Bit $b'_3$ equal to "1" indicates that the magnetic-disk unit is reserved by another control unit (also called as BUSY) when the reserve command is executed. Bits $b'_2$ to $b'_0$ indicate the unit number of the magnetic-disk unit. The content of the bits $b_2$ to $b_0$ of the control register 15 are held in bits $b'_2$ to $b'_0$ just after the execution of the reserve command.

The operation of the dual access control system will now be described in more detail.

Figure 5:
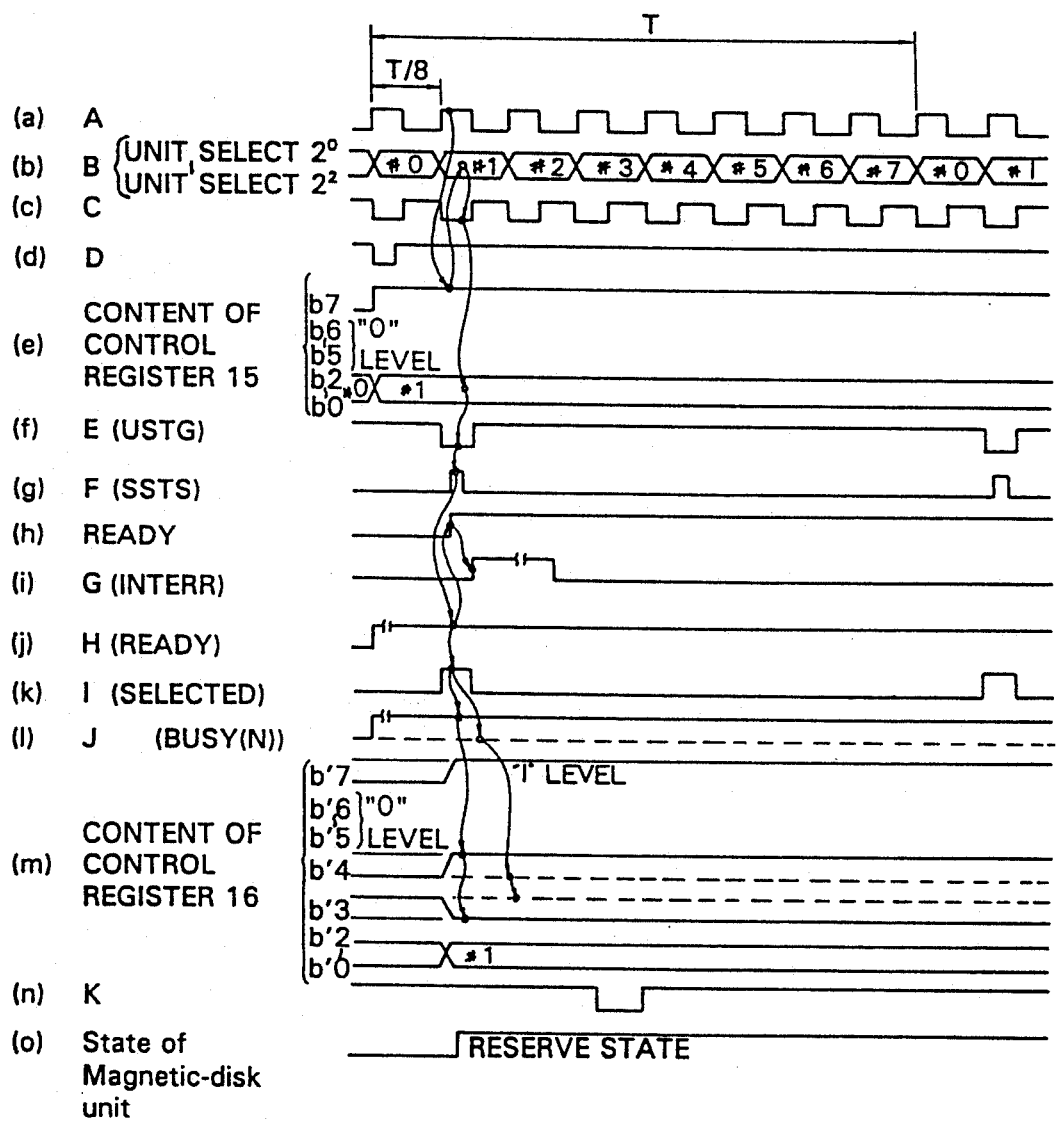
FIG. 5 is a timing diagram of the dual access control system while executing a reserve function according to the first embodiment of the present invention.

FIG. 5 is a timing diagram of the dual access control system while executing the reserve function according to the first embodiment of the present invention wherein the reserve command is issued to reserve magnetic-disk unit #1. An output signal A issued by the hard disk controller LSI 14 is a signal for selecting the magnetic-disk unit. Output signal A represents a polling signal during cycle T and while the hard disk controller LSI 14 is in an idle state. The output signal A is supplied to the unit address register 17, the inverter 19 and the NAND gate 20. An output signal C from the inverter 19 enables the comparator 18 when the output signal C is at a "0" level.

An output signal N from the hard disk controller LSI 14 comprises three bits which are coded to specify a magnetic-disk unit number wherein the specified magnetic-disk unit number operates to select a corresponding magnetic-disk unit (as described below). The magnetic-disk unit number is coded as illustrated in FIG. 3(b). The output signal N is sampled at the leading edge of the output signal A and stored in the unit address register 17. The sampled output signal N is output from the unit address register 17 via an output signal B. The output signal B is supplied to the magnetic-disk unit via the UNIT SELECT $2^0$ to $2^2$ signal lines and the driver 32. The UNIT SELECT $2^0$ to $2^2$ signal lines are significant only when the USTG signal is enabled. The output signal B is also supplied to the comparator 18. The comparator 18 compares the output signal B with bits $b_2$ to $b_0$ of the control register 15. The comparator 18 outputs a "0" (more particularly, the value "0" is output from the inversion "bubble" at the output of the comparator 18) when the output signal B is equal to bits $b_2$ to $b_0$ of the control register 15. The output signals A, B, C are always generated when the hard disk controller LSI 14 is in an idle state as illustrated in FIG. 5. While the hard disk controller LSI 14 is in the idle state, the reserve command is supplied together with a set timing signal D to the control register 15 via the host data bus 33 upon command of the host program wherein the bit $b_7$ of the control register 15 becomes equal to "1". This value of bit $b_7$ is input to the NAND gate 20 to thereby generate an output signal equalling "0". The set timing signal D is synchronized with the output signal A by a synchronization circuit, not shown. The comparator 18 is synchronized with the NAND gate 20 and generates a signal equal to "0". The signals generated by the comparator 18 and the NAND gate 20 are input to the NOR gate 21 thereby providing an output signal E. The output signal E is processed by the driver 32 and represents the USTG signal which is supplied to the magnetic-disk unit 70. The USTG signal is the TAG signal for selecting the magnetic-disk unit 70 wherein the UNIT SELECT $2^0$ to $2^2$ signal specifies the magnetic-disk unit number. For purposes of illustration, assume the magnetic-disk unit #1 is being selected and reserved. When the unreserved magnetic-disk unit #1 is reserved, the magnetic-disk unit #1 responds via the SELECTED signal. When the reserved magnetic-disk unit #1 is reserved by another control unit, the magnetic-disk unit #1 responds via the BUSY(N) signal. The reserved/unreserved status of the magnetic-disk unit #1 is sampled by reading the control register 16 using an output signal F which represents a sense status (hereinafter referred to as SSTS) signal. The SSTS signal is generated by the hard disk controller LSI 14. The output signal F inverts the values of bit $b'_4$ and bit $b'_3$ in control register 16. A READY signal from the receiver 27 is sampled and sent to the transition control part 14a in synchronization with the output signal F. When the READY signal is sent to the READY transition part 14a, an interruption signal G is sent to the CPU of the host unit 62. According to the present embodiment, a transition interruption is then made from NOT READY to READY.

After receiving the transition interruption, the CPU 64 of the host unit 62 issues a command to read the content of the control register 16 so that the CPU 64 can determine whether the magnetic-disk unit is reserved or not. When the command to read the control register 16 is executed, the output signal K goes to a "0" level so that the content of the control register 16 is transferred to the CPU 64 via the host data bus 33. Once the magnetic-disk unit #1 is reserved, the CPU can write to and read from the magnetic-disk unit #1 at any time by providing appropriate commands to the hard disk controller LSI 14 via the host data bus 33.

Figure 6:
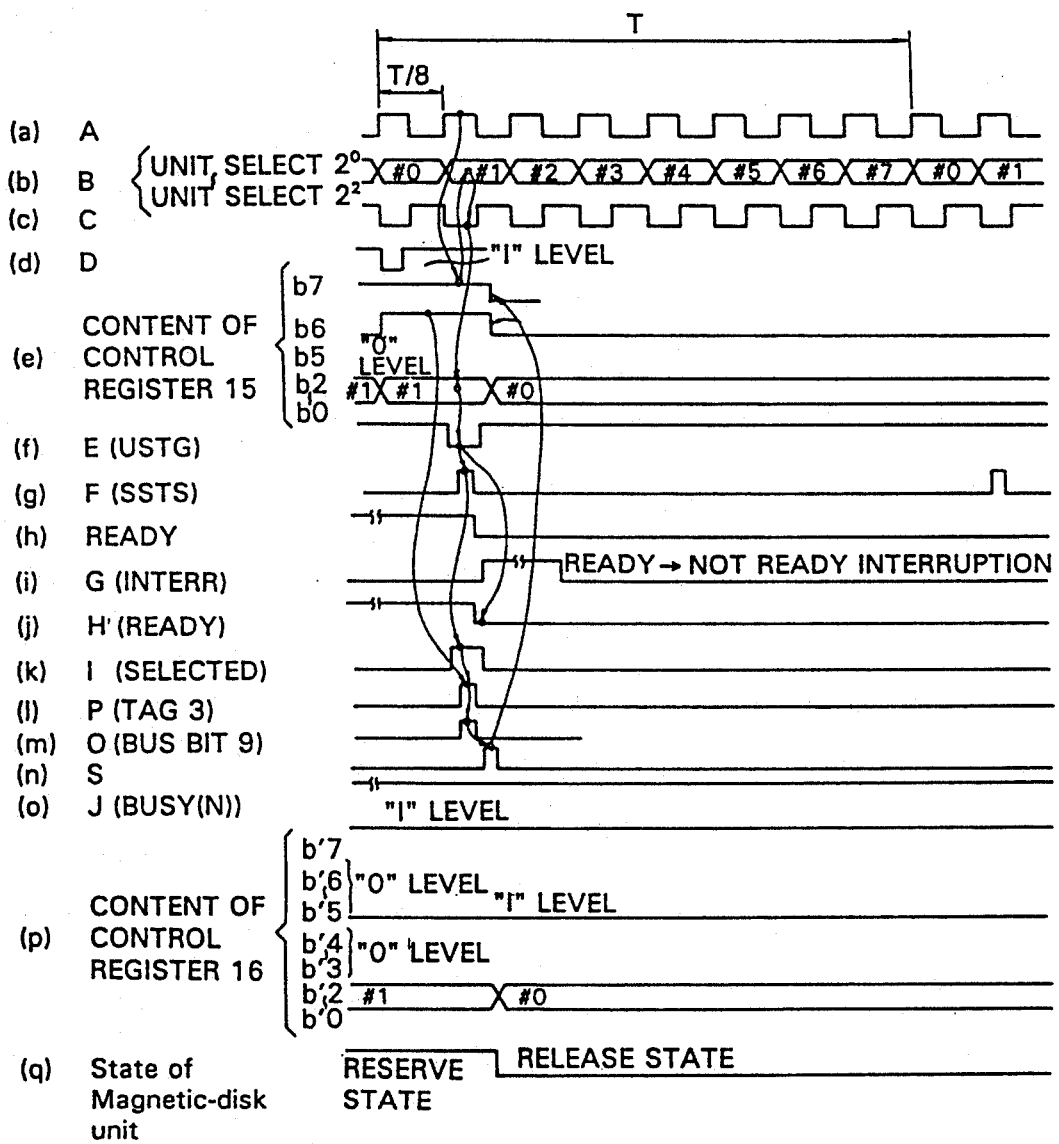
FIG. 6 is a timing diagram of the dual access control system while executing a release function according to the first embodiment of the present invention.

FIG. 6 is a timing diagram of the dual access control system while executing the release function in accordance with the first embodiment of the present invention. The release command is used to unreserve a reserved magnetic-disk unit. For illustrative purposes, assume the magnetic disk unit #1 is reserved, and that a release command is issued in accordance with the timing of the D signal (that is, the change of state of the D signal). Upon the issuance of the release command, the bit $b_6$ of the control register 15 goes to "1" while the bit $b_7$ of the control register 15 remains at "1". Bit $b_6$ is ANDed at the AND gate 23. The output of AND gate 23 is supplied to the OR gate 24. The output of the OR gate 24 has a value "1" and is labelled P. The signal P is supplied to the magnetic-disk unit #1 via the driver 32 as the TAG 3 signal. A signal L, which is applied as an input to the OR gate 24, and a signal M, which is applied to the OR gate 25, are always "0" whenever the hard disk controller LSI 14 idles. In the same way, since the bit $b_5$ of the control register 15 is at the "0" level, the output signal of the OR gate 25 is "0". The OR gate 26 receives the output signal of the OR gate 25 and the output signal R of the AND date 23 and thereby generates an output signal O equal to "1". The output signal O of the OR gate 26 is supplied to the magnetic-disk unit #1 as the BUS BIT 9 signal via the driver 32. When the TAG 3 signal is enabled and the BUS BIT 9 signal is equal to "1", the magnetic-disk unit #1 executes the release function. Because the response signal to the release function is not specifically prescribed, the output signal R of the AND gate 23 is sent to the latter differential pulse generating circuit 29 which generates an output signal S based on the value of the output signal R. The control register 15 is reset by the output signal S. As a result, the bit $b_7$ of the control register 15 becomes "0", such that the USTG signal is not provided to the magnetic-disk unit #1 (by operation of the NAND gate 20). Consequently, the READY signal is not supplied to the ready transition control part, such that the READY transition interruption signal G is generated indicating NOT READY, rather than READY. In this manner, the host program of the CPU 64 is able to recognize the completion of the execution of the release command.

Figure 7:
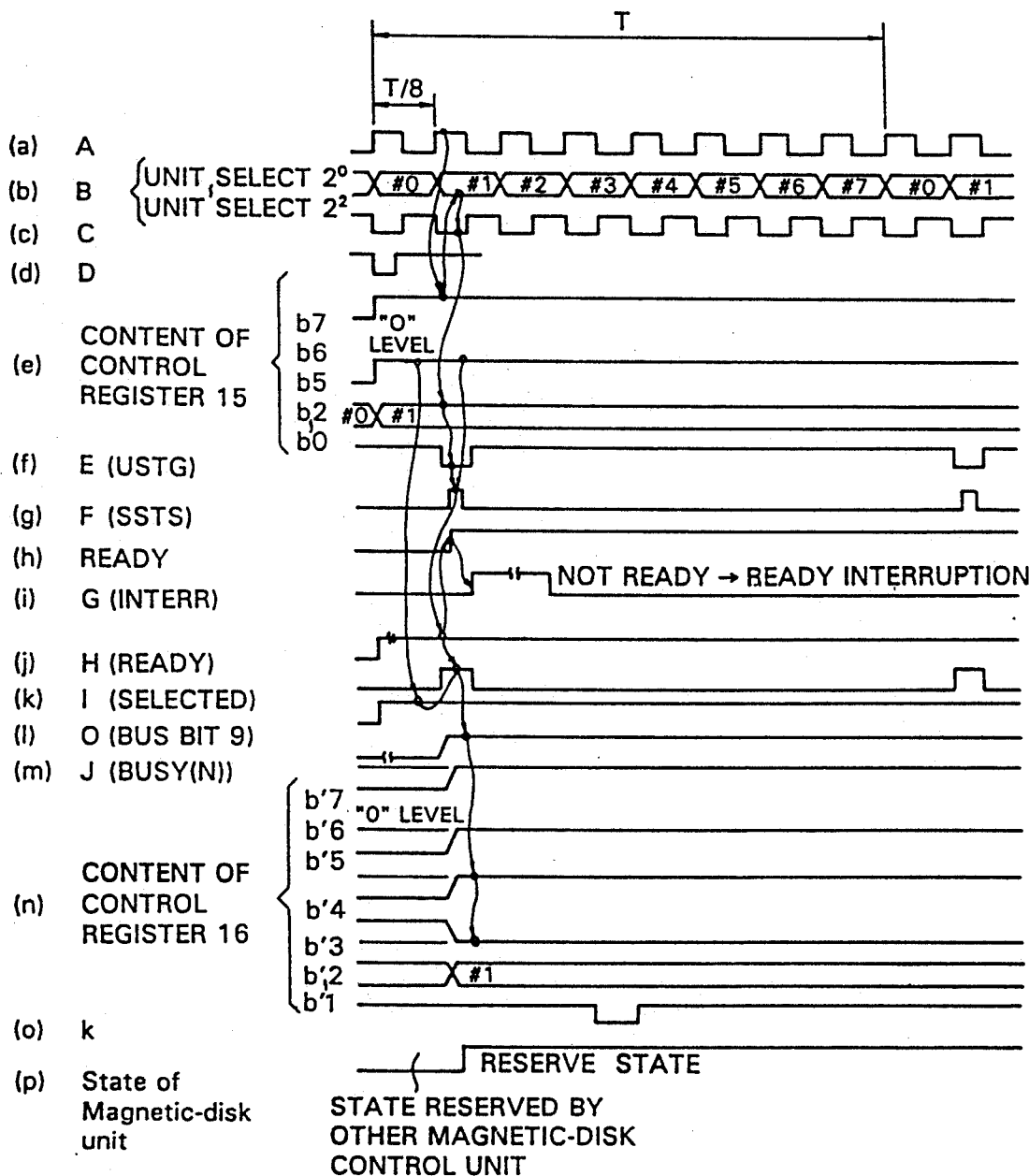
FIG. 7 is a timing diagram of the dual access control system while executing a priority select function according to first embodiment of the present invention.

FIG. 7 is a timing diagram showing the selection of the priority select function according to the first embodiment of the present invention in which the priority select command is issued to the magnetic-disk unit #1 which is already reserved by another control unit.

In FIG. 7, the priority select command is issued in accordance with the timing of the D signal (similar to the issuance of the reserve command). Consequently, the bit $b_5$ of the control register 15 goes to the "1" level while the bit $b_7$ is kept at the "1" level and the bit $b_6$ is kept at the "0" level. As a result, the output signal O becomes equal to "1" via the OR gates 25, 26 and is thereafter supplied to the magnetic-disk unit #1 as the BUS BIT 9 signal via the driver 32. When both the USTG signal and the BUS BIT 9 signal are enabled (that is, equal to "1"), the magnetic-disk unit #1 executes the priority select command such that it is reserved by the control unit irrespective of the reservation of the magnetic-disk unit #1 by another control unit. The result of the execution of the priority select command is recognized by the host program of the CPU 64 in the same way as for the reserve command.

Although the abort command is not illustrated in a timing diagram, the abort command is executed when the selection of the magnetic-disk unit is abandoned without waiting for the completion of the execution of the reserve command, the release command, or the priority select command. The result of the execution of the abort command is not reported to the host program.

As mentioned above, the control registers 15, 16 and the hard disk controller LSI 14 contend (i.e., compete) with each other for access to the magnetic-disk unit.

Second Embodiment (FIGS. 8-13)

A dual access control system according to a second embodiment of the present invention will be described with reference to FIGS. 8-13.

Figure 8A:
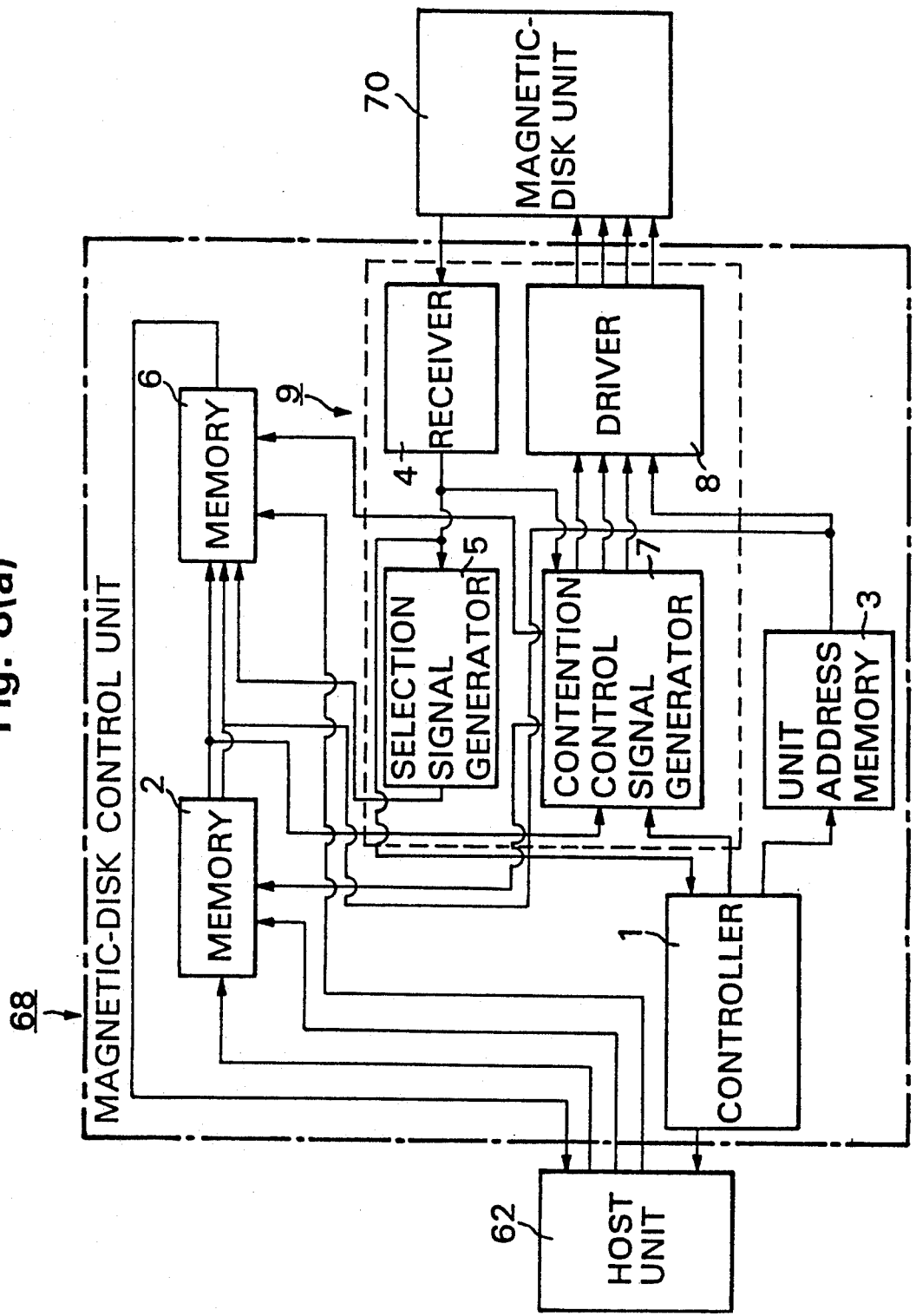
FIGS. 8(a) and 8(b) are block diagrams of a dual access control system according to a second embodiment of the present invention.
Figure 8B:
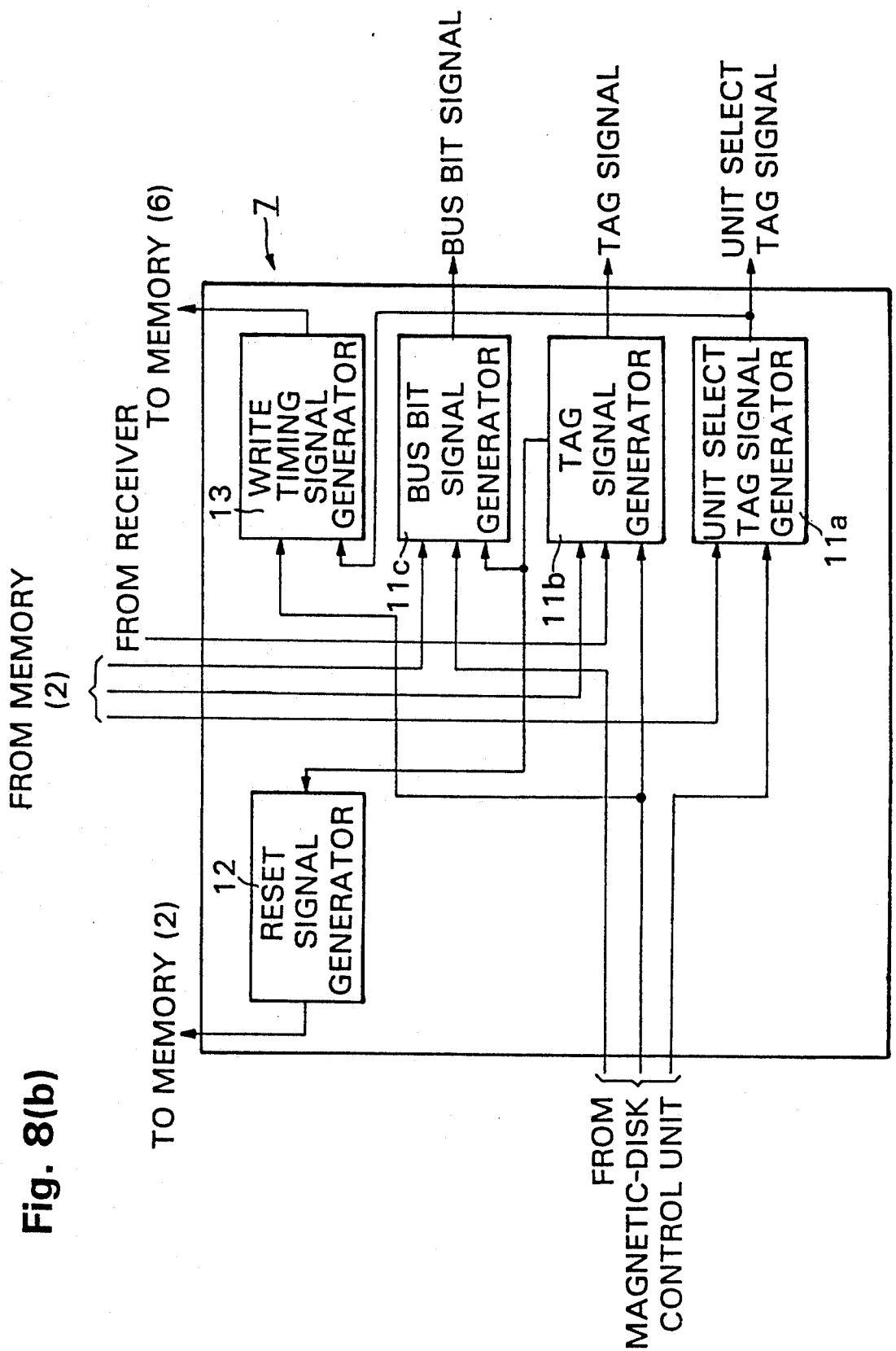

FIGS. 8(a) and 8(b) are block diagrams of a dual access control system according to a second embodiment of the present invention.

The dual access control system according to the second embodiment is different from that of the first embodiment only with respect to the write-only memory 2, read-only memory 6 and the contention control signal generator 7. Like elements are designated using the same reference numerals.

Both the write-only memory 2 and the read-only memory 6 respond to each unit address. They are selected by an output signal from the unit address memory 3. The unit select tag generator 11a of the contention control signal generator 7 receives a polling signal from the control unit 1 and the output signal from the write-only memory 2 and generates the unit select tag signal.

The circuit diagram of the second embodiment as illustrated in FIG. 9 is different from that of the first embodiment in the following ways.

The write-only control register 15 (hereinafter referred to as control register 15) and the read-only control register 16 (hereinafter referred to as control register 16) comprise the control registers 15a to 15h (each including eight bits) and control registers 16a to 16h (each including eight bits), respectively. The control registers 15 and 16 are selected by the output signal of the unit address register 17. Accordingly, the comparator 18, the inverter 19, the NOR gate 21 and the NAND gate 20 of the first embodiment are unnecessary in the second embodiment and are replaced by the AND gate 20' in the circuit diagram of the second embodiment.

The control register 15 stores the dual access control command for the magnetic-disk unit 70. The host program can write the command into the control register 15 in response to the unit address when the hard disk controller LSI 14 is not writing or reading from the magnetic-disk unit 70, i.e., the magnetic-disk unit 70 is idle. The significance and meaning of each of the bits of the control register 15 is shown in FIG. 3.

The control register 16 stores a status code which indicates the result of executing the dual access control command. The host program can read the status code from control register 16 when necessary depending on the unit address. The significance and meaning of each of the bits of the control register 16 is shown in FIG. 4.

FIG. 10 illustrates the relationship among the unit addresses of the magnetic-disk unit, the write-only control register and the read-only control register according to the second embodiment. For example, for the unit address #0, the corresponding write-only control register is 15a and the corresponding read-only control register is 16a.

The operation of the dual access control system according to the second embodiment will now be described in more detail.

Figure 11:
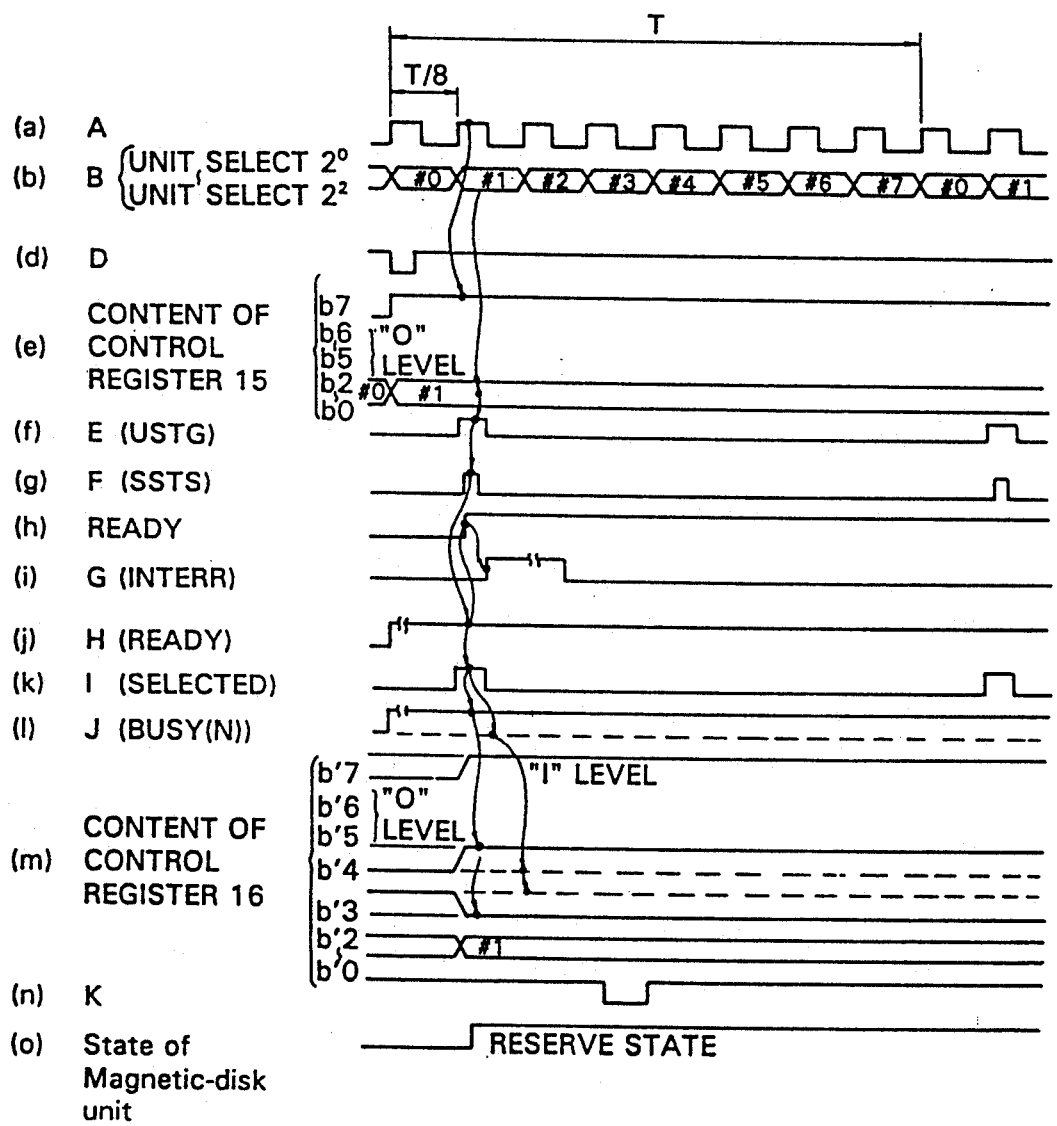
FIG. 11 is a timing diagram of the dual access control system while executing a reserve function according to the second embodiment of the present invention.

FIG. 11 is a timing diagram of the dual access control system while executing a reserve function in accordance with the second embodiment wherein the reserve command is issued with respect to the magnetic-disk unit #1.

An output signal A from the hard disk controller LSI 14 selects the magnetic-disk unit #1 by polling during a cycle T when the hard disk controller LSI 14 is idle. The output signal A is sent to the unit address register 17 and the AND gate 20'.

An output signal N from the hard disk controller LSI 14 comprises three bits and selects one of the magnetic-disk unit numbers during the polling time. The magnetic-disk unit number is coded as illustrated in FIG. 3(b). The output signal N is sampled at the leading edge of the output signal A and stored in the unit address register 17 and is subsequently propagated as output signal B. The output signal B is sent to the magnetic-disk unit as the UNIT SELECT $2^0$ to $2^2$ signal via the driver 32, the output signal B being indicative of the magnetic-disk unit number. The UNIT SELECT $2^0$ to $2^2$ signal is significant when the USTG signal is enabled. The output signal B is also sent to both control registers 15, 16 for selecting one of the control registers 15, 16 in accordance with the value of the unit address. The bit $b_7$ of the control register 15 or 16 thus selected by the output signal B is supplied to the AND gate 20' which generates a signal equal to "1" and sends the signal to the magnetic-disk unit #1. Specifically, the output from the AND gate 20' is sent to the magnetic-disk unit #1 as the USTG signal via the driver 32. The output signals A, B are always provided as illustrated in FIG. 11 whenever the hard disk controller LSI 14 is idle. While idle and when the reserve command for the magnetic-disk unit #1 is provided together with the set timing signal D to the control register 15 via the host data bus 23, the bit $b_7$ of the control register 15b of the unit address #1 goes to a value of "1" such that the AND gate 20' as shown in FIG. 9 generates an output signal equal to "1", thereby enabling the output signal E. The set timing signal D is synchronized with the output signal A by a synchronizing circuit, not shown. The use of the control register 15 to specify a unit address and the selection of the control register 15 or 16 by the output signal A are controlled by a contention control circuit, not shown. The output signal E becomes the USTG signal via the driver 32. The USTG signal is supplied to the magnetic-disk unit 70. The USTG signal is a TAG signal for selecting the magnetic-disk unit 70, wherein the UNIT SELECT $2^0$ to $2^2$ signal indicates the magnetic-disk unit number. For illustrative purposes, assume that the magnetic-disk unit #1 is being reserved. When the magnetic-disk unit #1 is reserved, the magnetic-disk unit #1 responds using the SELECTED signal. When another control unit attempts to reserve the magnetic-disk unit #1, the magnetic-disk unit #1 responds using the BUSY(N) signal. The status of the magnetic-disk unit #1 is sampled in the control register 16b by an output signal F which represents a sense status signal (hereinafter referred to as SSTS). The contents of the bits of the control register 16b are illustrated in FIG. 3. The values of bit $b'_4$ and bit $b'_3$ are inversed. A READY signal is sampled in the hard disk controller LSI 14 during pulses of the output signal F and the sampled READY signal is supplied to the READY transition control part 14a. When the READY signal is supplied to the READY transition control part 14a, an interruption signal G is sent to the CPU 64 of the host unit 62. According to the present embodiment, the interruption signal G changes from NOT READY to READY.

After receiving the interruption signal G, the CPU 64 of the host unit 62 issues a command to read the content of the control register 16b to determine whether the magnetic-disk unit is reserved or not. When the command to read the control register 16b is executed, the output signal goes to a "0" level such that the content of the control register 16b is transferred to the CPU 64 via the host data bus 33. After reservation of the magnetic-disk unit #1 is complete, the CPU can read from and write to the magnetic-disk unit #1 by sending appropriate commands to the hard disk controller LSI 14.

Figure 12:
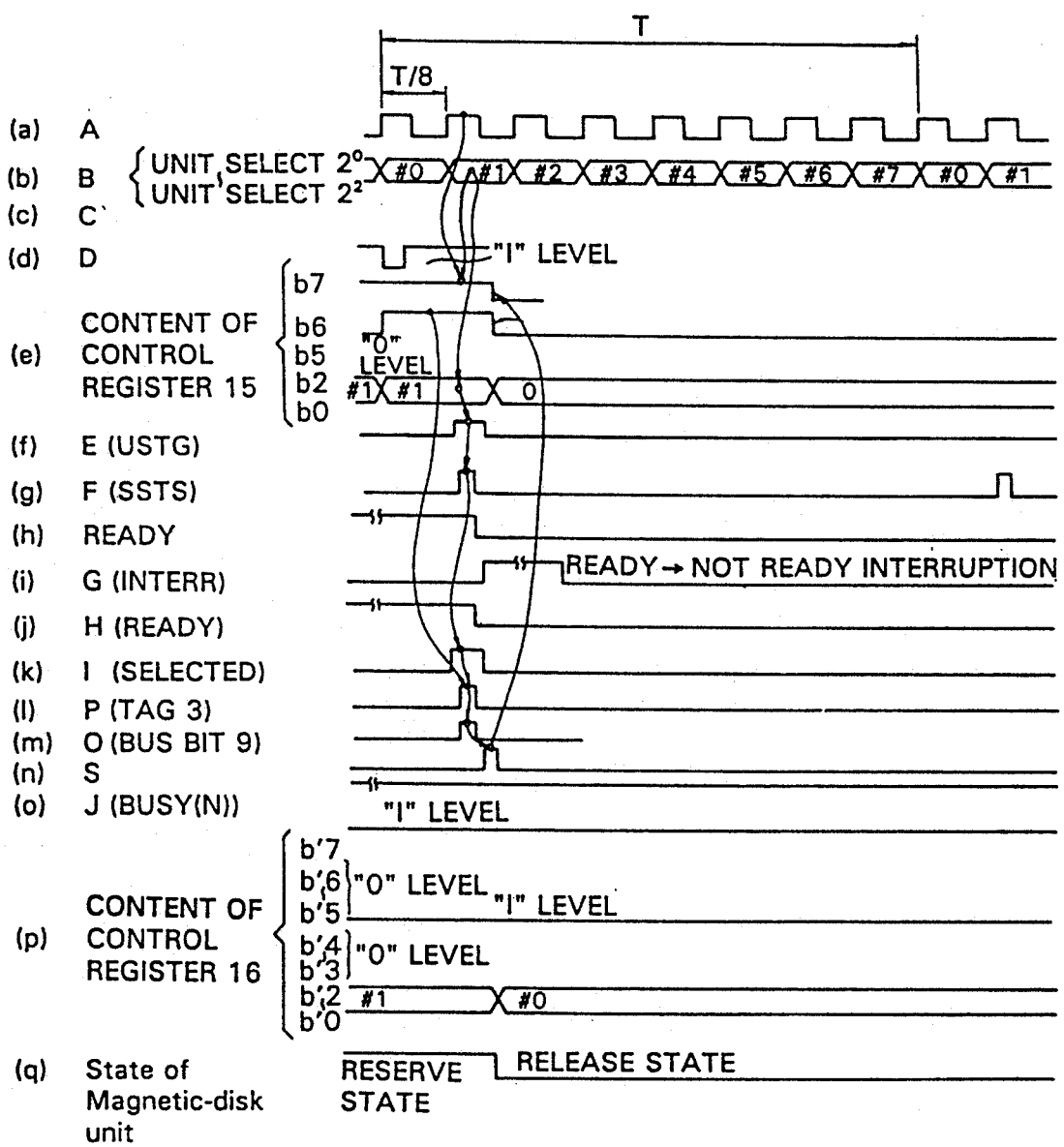
FIG. 12 is a timing diagram of the dual access control system while executing a release function according to the second embodiment of the present invention.

FIG. 12 is a timing diagram of the dual access control system while executing the release function in accordance with the second embodiment of the present invention. FIG. 12 illustrates the case where the release command is executed with respect to the magnetic-disk unit #1, the magnetic-disk unit #1 being reserved by a control unit. The release command is issued at a pulse of the timing D (similar to the issuance of the reserve command). Upon issuance, the bit $b_6$ of the control register 15 goes to a "1" value while the bit $b_7$ of the control register 15 stays at a "1" value. Both signals are ANDed at the AND gate 23. The output of the AND gate 23 is sent to the OR gate 24. The output of the OR gate 24, labelled P, has a value of "1". The signal P is supplied to the magnetic-disk unit #1 via the driver 32 as the TAG 3 signal. A signal L, applied to the OR gate 24, and a signal M, applied to the OR gate 25, is always "0" whenever the hard disk controller LSI 14 is idle. In the same way, since the bit $b_5$ of the control register 15b is "0", the output signal of the OR gate 25 is "0". The OR gate 26 receives the output signal from the OR gate 25 and the output signal from the AND gate 23 and generates an output signal O equal to "1". The output signal O from the OR gate 26 is supplied to the magnetic-disk unit #1 as the BUS BIT 9 signal via the driver 32. When the TAG 3 signal is enabled and the BUS BIT 9 signal is equal to "1", the magnetic-disk unit executes the release function. The response signal to the release function is not specifically prescribed. Consequently, the output signal R from the AND gate 23 is supplied to the latter differential pulse generating circuit 29, which generates an output signal S based on the value of the output signal R. The control register 15 is reset by the output signal S. As a result, the bit $b_7$ of the control register 15 is set to "0", such that the AND gate 20 prevents the signal A from reaching the magnetic-disk unit (via the driver 32 as the USTG signal). Consequently, the READY signal is not supplied to the READY transition control part 14a, thereby changing the value of the READY transition interruption signal G from READY to NOT READY. In this manner, the host program of the CPU 64 can recognize the completion of the execution of the release command.

Figure 13:
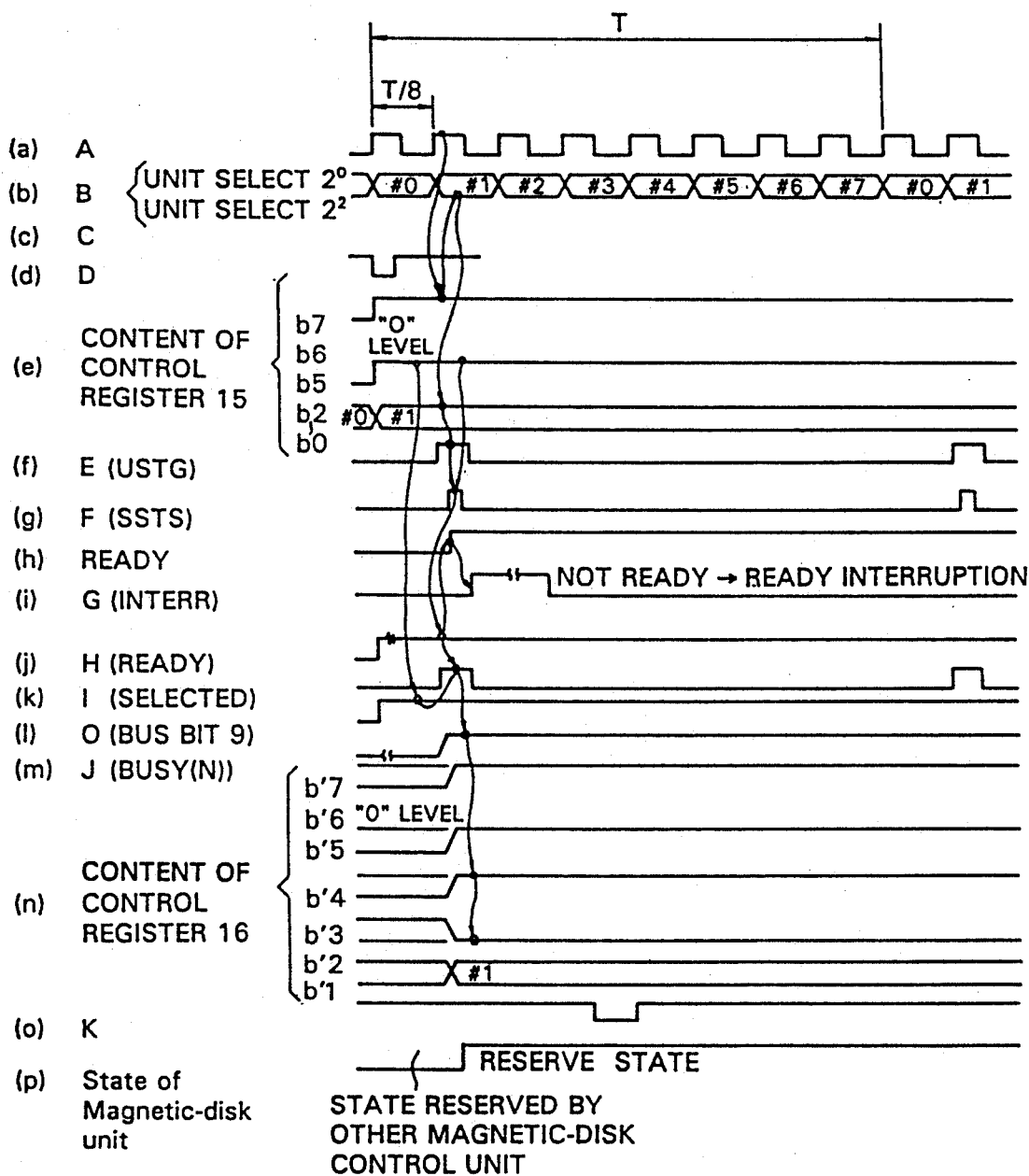
FIG. 13 is a timing diagram of the dual access control system while executing a priority select function according to the second embodiment of the present invention.
Figure 14:
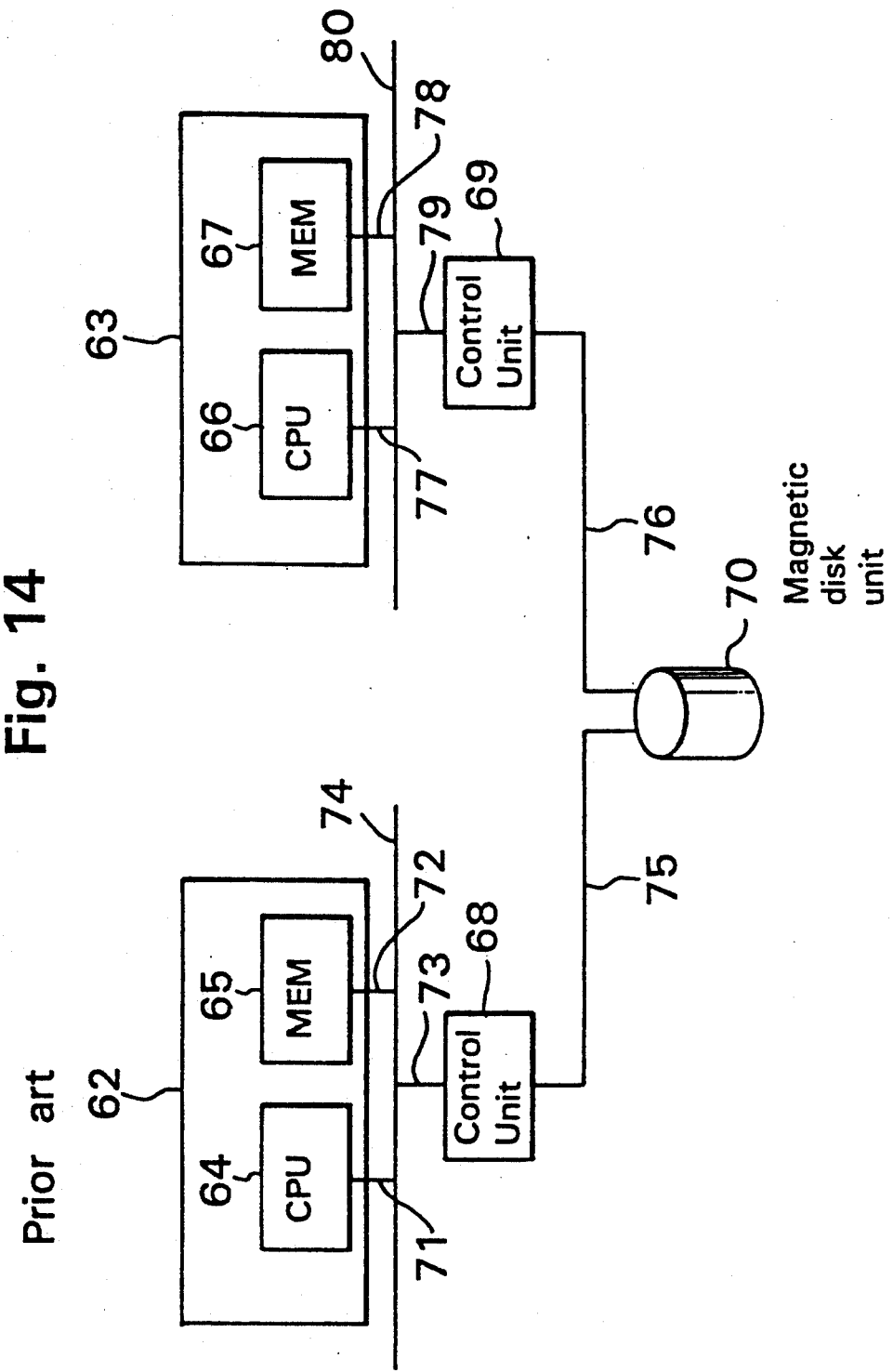
FIG. 14 is a block diagram of a prior art dual access control system.
Figure 15:
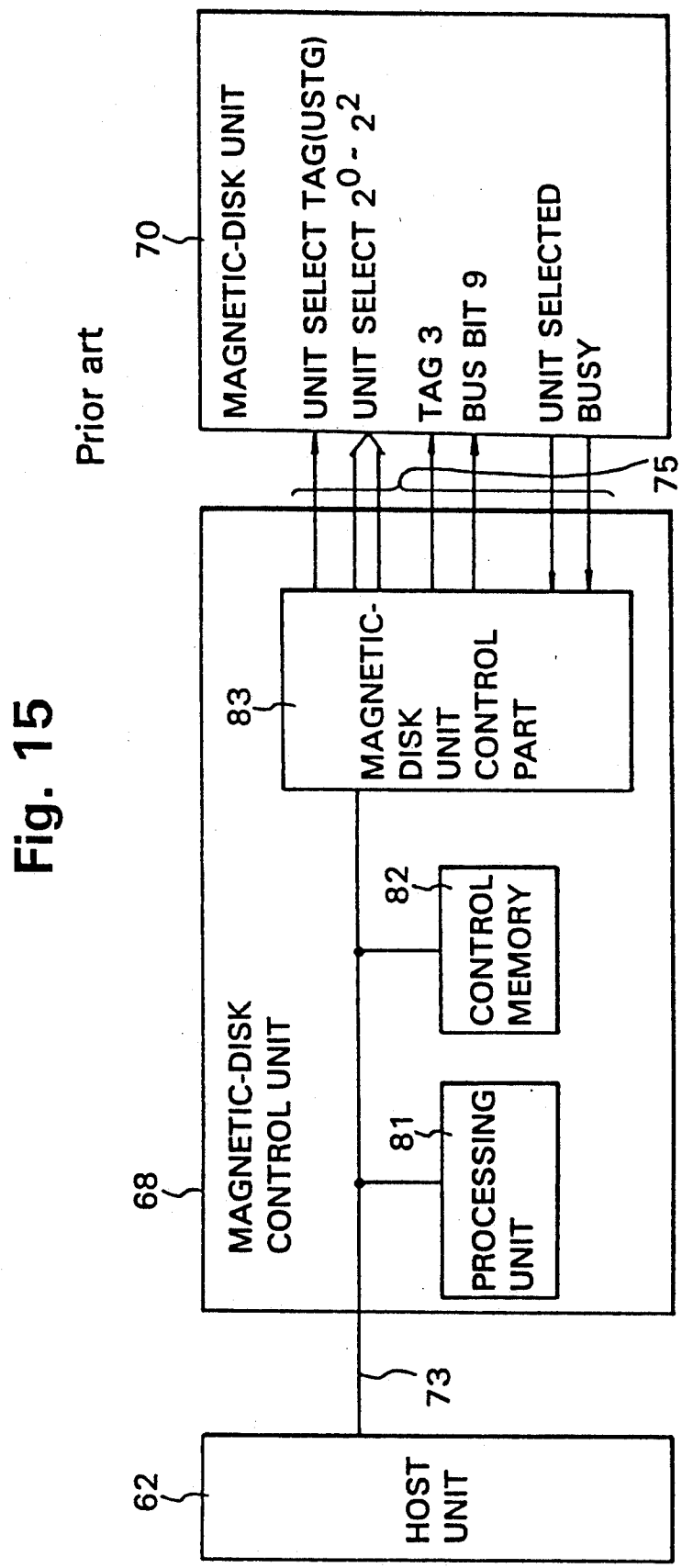
FIG. 15 is an additional block diagram of the prior art dual system of FIG. 14.
Figure 16:
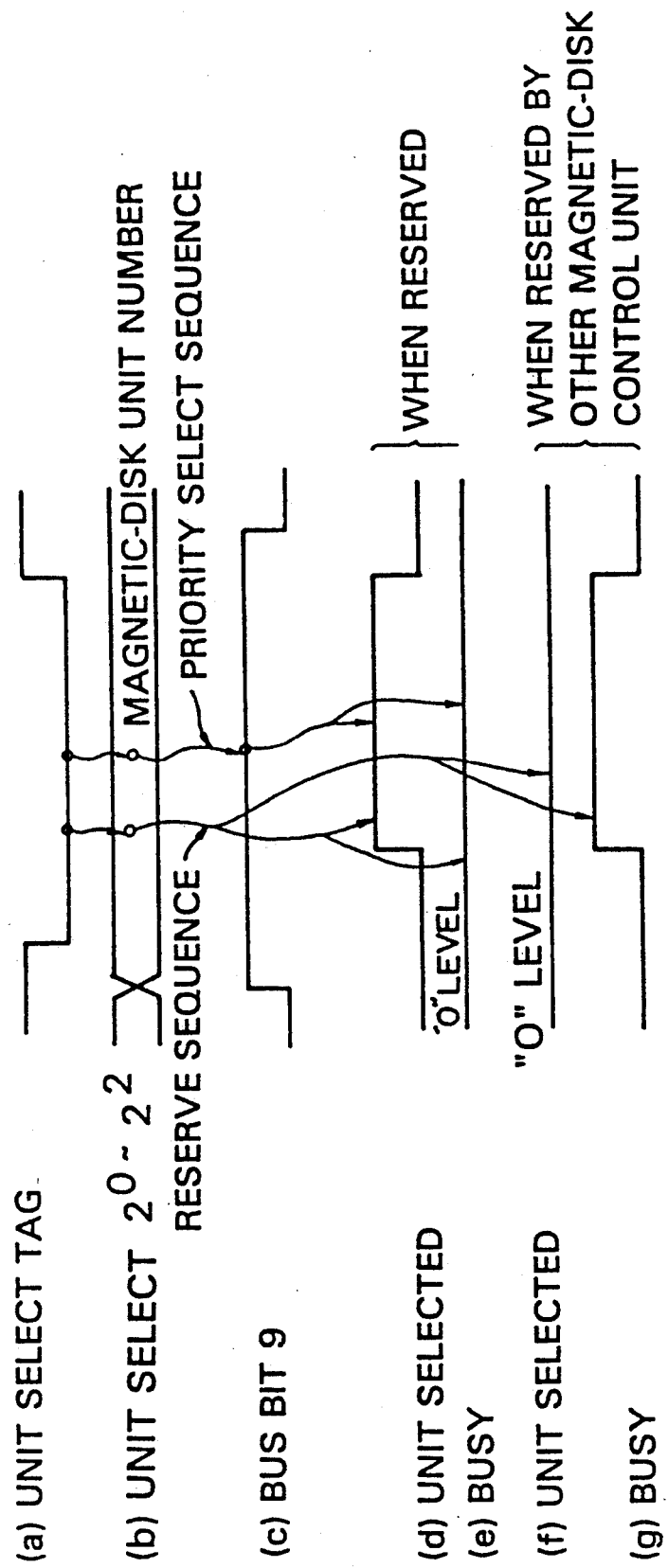
FIG. 16 is a timing diagram of the prior art dual access control system of FIGS. 14 and 15 while executing a reserve and priority select sequence.
Figure 17:
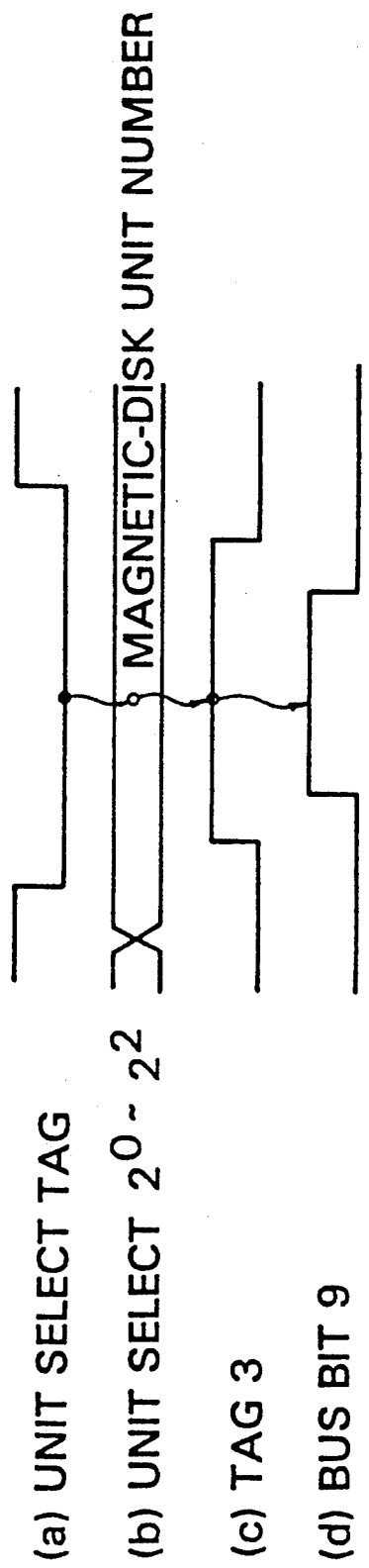
FIG. 17 is a timing diagram of the prior art dual access control system of FIGS. 14 and 15 while executing a release sequence.

FIG. 13 is a timing diagram of the dual access control system while executing the priority select function according to the second embodiment in which the priority select command is issued with respect to the magnetic-disk unit #1 which is already reserved by another control unit.

The priority select command is issued when the timing signal D pulses (similar to the issuance of the reserve command). Upon the issuance of the priority select command, the bit $b_5$ of the control register 15b goes to a "1" level while the bit $b_7$ remains at a "1" level and the bit $b_6$ remains at a "0" level. As a result, the output signal O is set to "1" by operation of the OR gates 25, 26 and is supplied to the magnetic-disk unit #1 as the BUS BIT 9 signal via the driver 32. When both the USTG signal and the BUS BIT 9 signal are enabled, the magnetic-disk unit #1 executes the priority select command such that it is reserved by the control unit irrespective of any prior reservation by the other control unit. The result of the execution of the priority select command is recognized by the host program of the CPU 64 in the same way as for the reserve command.

Although the abort command is not illustrated in a timing diagram, the abort command is executed when selection of the magnetic-disk unit is abandoned without waiting for the completion of the execution of the reserve command, the release command, or the priority select command. The result of the execution of the abort command is not reported to the host program.

According to the dual access control system of the second embodiment, by providing a magnetic-disk unit with the control registers 15 and 16, it is possible to execute the reserve, release, priority select and abort commands independently of other magnetic-disk units. Accordingly, the dual access control system of the second embodiment is better adapted for general purposes than the dual access control system of the first embodiment.

Although the invention has been described herein in its preferred form with a certain degree of particularity, it is to be understood that many variations and changes are possible in the invention without departing from the scope thereof.

What is claimed is:

1. A dual access control system including a magnetic-disk unit and a magnetic-disk control unit, the magnetic-disk control unit comprising means for receiving from a host unit a unit address of the magnetic-disk unit and a reserve command to reserve the magnetic-disk unit, the dual access control system further comprising:

magnetic-disk control means for generating signals in accordance with the reserve command, the generated signals comprising the unit address, for sending the generated signals to the magnetic-disk unit to reserve the magnetic-disk unit, for receiving an output signal indicative of execution of the reserve command from a contention controller, and for supplying an interrupt signal to the host unit to report execution of the reserve command;

first memory means for storing the reserve command and the unit address in synchronization with a timing signal issued by the host unit;

unit address memory means for storing the unit address contained in the signals generated by the magnetic-disk control means;

second memory means for storing a stored content of the first memory means and a selection signal indicative of selection or non-selection of the magnetic-disk unit and for supplying the stored content of the first memory means and the selection signal to the host unit in synchronization with the timing signal issued by the host unit;

wherein the contention controller comprises means for receiving output signals from the unit address memory means and the first memory means, and for generating a unit select tag signal to indicate that the unit address is valid, the contention controller further comprising means for receiving a response signal from the magnetic-disk unit and the signals from the magnetic-disk control means, for generating and supplying a tag signal and a bus bit signal to the magnetic-disk unit, for generating and supplying a reset signal to the first memory means, for generating and supplying the selection signal and a write timing signal to the second memory means, and for generating and supplying an output signal to the magnetic-disk control unit.

2. A dual access control system according to claim 1, the contention controller further comprising a receiving means for receiving the response signal from the magnetic-disk unit, a selection signal generating means for receiving an output signal from the receiving means and for generating the selection signal, a contention control signal generating means for receiving the output signals from the first memory means and the unit address memory means, for generating the unit select tag signal, for receiving the signals from the magnetic-disk control means and the output signal from the receiving means, for generating and supplying the tag signal and the bus bit signal to the magnetic-disk unit, for generating and supplying the reset signal to the first memory means, for generating and supplying the selection signal and the write timing signal to the second memory means, and for generating and supplying the output signal to the magnetic-disk control unit.

3. A dual access control system according to claim 2, the contention control signal generating means further comprising a unit select tag signal generating means for generating the unit select tag signal to indicate that the unit address is valid when a content of the unit address memory means corresponds to a content of the first memory means, a tag signal generating means for generating the tag signal which is supplied to the magnetic-disk unit upon receiving the signals from the magnetic-disk control means, the output signals from the first memory means and the output signal from the receiving means, and a bus bit generating means for generating the bus bit signal upon receiving the signals from the magnetic-disk control means, the output signals from the first memory means and output signals from the tag signal generating means.

4. A dual access control system including a plurality of magnetic-disk units and a magnetic-disk control unit, the magnetic-disk control unit comprising means for receiving from a host unit one or more unit addresses of the magnetic-disk units and a reserve command to reserve one or more of the magnetic-disk units, the dual access control system further comprising:

magnetic-disk control means for generating signals in accordance with the reserve command, the generated signals comprising the received unit addresses, and for sending the signals to the magnetic-disk units, for receiving an output signal indicative of execution of the reserve command from a contention controller, and for supplying an interrupt signal to the host unit to report execution of the reserve command;

first memory means for storing the reserve command and the one or more unit addresses of the magnetic-disk units in synchronization with a timing signal issued by the host unit;

unit address memory means for storing the one or more unit addresses contained in the signals generated by the magnetic-disk control means;

second memory means for storing a stored content of the first memory means and a selection signal indicative of selection or non-selection of the magnetic-disk units and for supplying the stored content and the selection signal to the host unit in synchronization with the timing signal issued by the host unit;

contention control means for receiving an output signal from the first memory means as specified by the unit address memory means, for receiving the signals generated by the magnetic-disk control means, and for generating a unit select tag signal to indicate that the one or more unit addresses are valid, the contention control means also receiving a response signal from the magnetic-disk units and a control signal from the magnetic-disk control unit, the contention control means also comprising means for generating and supplying a tag signal and a bus bit signal to the magnetic-disk units, for generating and supplying a reset signal to the first memory means, for generating and supplying the selection signal and a write timing signal to the second memory means, and for generating and supplying an output signal to the magnetic-disk control unit.

5. A dual access control system according to claim 4, wherein the contention control means further comprises a receiving means for receiving the response signal from the magnetic-disk units, a selection signal generating means for receiving an output signal from the receiving means and for generating the selection signal, a contention control signal generating means for receiving the output signal from the first memory means, for generating the unit address tag signal, for receiving the signals from the magnetic-disk control means and the output signal from the receiving means, for generating and supplying the tag signal and the bus bit signal to the magnetic-disk unit, for generating and supplying the reset signal to the first memory means, for generating and supplying the selection signal and the write timing signal to the second memory means, and for generating and supplying the output signal to the magnetic-disk control unit.

6. A dual access control system according to claim 5, wherein the contention control signal generating means further comprises a unit select tag signal generating means for generating a tag signal to indicate that the unit addresses are valid when the signals generated by the magnetic-disk control means and the output signal from the first memory means are received, a tag signal generating means for generating the tag signal upon reception of the signals from the magnetic-disk control means, the output signal from the first memory means and the output signal from the receiving means, and a bus bit generating means for generating the bus bit signal upon reception of the signals from the magnetic-disk control means, the output signal from the first memory means, and output signals from tag signal generating means.

* * * * *